United States Patent
Wang et al.

(10) Patent No.: US 7,772,722 B2
(45) Date of Patent: Aug. 10, 2010

(54) SWITCHING SYSTEM AND METHOD FOR ADJUSTMENT THEREOF

(75) Inventors: Jen-Chih Wang, Taoyuan Hsien (TW); Sean Chang, Taoyuan Hsien (TW)

(73) Assignee: Delta Electronics, Inc., Taoyuan Hsien (TW)

( * ) Notice: Subject to any disclaimer, the term of this patent is extended or adjusted under 35 U.S.C. 154(b) by 1170 days.

(21) Appl. No.: 11/390,063

(22) Filed: Mar. 28, 2006

(65) Prior Publication Data
US 2006/0226709 A1 Oct. 12, 2006

(30) Foreign Application Priority Data
Apr. 8, 2005 (TW) ............................... 94111130 A (51) Int. Cl.
*H01H 47/20* (2006.01)
*H01H 51/32* (2006.01)
(52) U.S. Cl. .................. 307/112; 307/129; 307/134; 307/415; 361/182; 361/183
(58) Field of Classification Search .................. 307/112, 307/129, 134, 415; 361/182, 183, 233
See application file for complete search history.

(56) References Cited

U.S. PATENT DOCUMENTS

| 6,798,635 B2 * | 9/2004 | Olsson ........................ 361/160 |
| 6,934,140 B1 * | 8/2005 | Rober et al. ................. 361/154 |
| 7,081,740 B2 * | 7/2006 | King ........................... 323/222 |
| 7,336,470 B2 * | 2/2008 | Satoh .......................... 361/160 |
| 7,525,293 B1 * | 4/2009 | Notohamiprodjo et al. .. 323/235 |
| 2008/0211478 A1 * | 9/2008 | Hussman et al. ............ 323/355 |

* cited by examiner

*Primary Examiner*—Albert W Paladini
*Assistant Examiner*—Hal I Kaplan
(74) *Attorney, Agent, or Firm*—Birch, Stewart, Kolasch & Birch, LLP (57) ABSTRACT

A switching system. The switching system includes an optical component, an electromagnetic switch, an auxiliary adjustment structure, and a control circuit. The optical component reflects or refracts a light. The electromagnetic switch, on one side of the optical component, controls the optical component to rotate or move in a direction. The auxiliary adjustment structure, on the optical component, controls the optical component to rotate or move in other direction. The control circuit, coupled to the electromagnetic switch, adjusts an on-off signal of the electromagnetic switch by a native frequency of the switching system, wherein the native frequency is obtained from an initial signal.

19 Claims, 9 Drawing Sheets

SWITCHING SYSTEM AND METHOD FOR ADJUSTMENT THEREOF

BACKGROUND

The invention relates to a switching system for a projection system and a method thereof, and more particularly, to a simple and low-cost switch of a switching system for a projection system and a method thereof.

Figure 1:
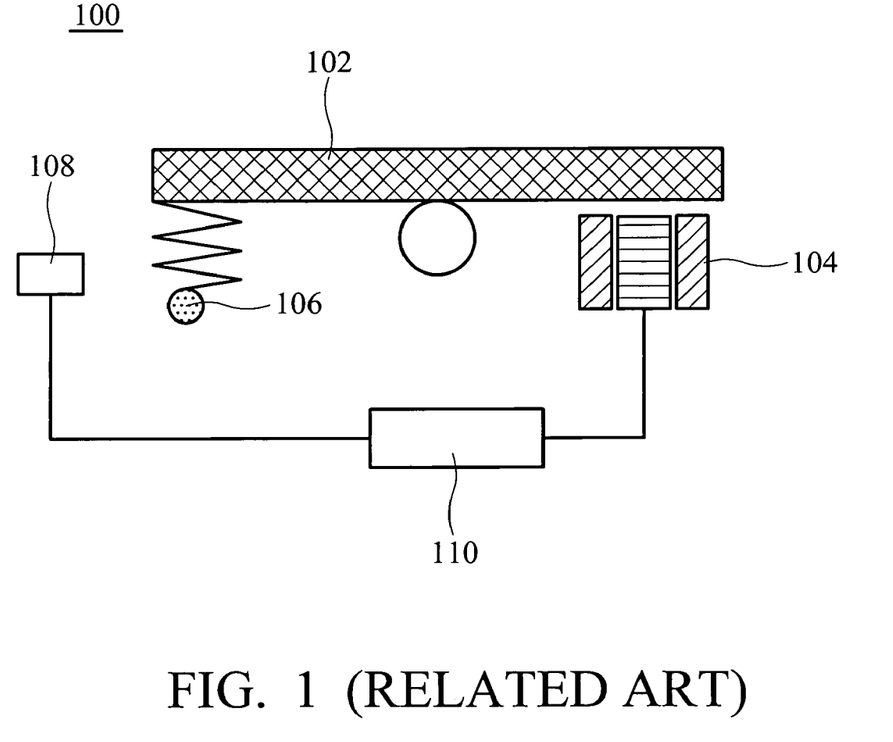
FIG. 1 is a diagram of a conventional switching system.

FIG. 1 shows a conventional switching system 100 for a projection system including a mirror 102, an electromagnet 104, a spring 106, a laser detector 108 and a controller 110. The laser detector 108 detects the position of the mirror 102, and sends position information of the mirror 102 to the controller 110. Then the controller 110 adjusts a frequency and a magnetic force of the electromagnet 104. Since the controller 110 controls the electromagnet 104 according to the result of laser detector 108, the switching system 100 is a closed loop switching system.

The laser detector 108 increases the complexity of the switching system 100. The controller 110 also requires a complex control program. Thus, the cost of conventional switching system 100 is very highest.

SUMMARY

Accordingly, a simple and low-cost switching system is provided, and the switching system can rapidly adjust the switching frequency thereof. The switching system of the invention can switch itself without additional monitoring devices, such that the positioning time and the cost of the switching system can be reduced and the reliability of the switching system can be increased.

An embodiment of the switching system comprises an optical component, an electromagnetic switch, an auxiliary adjustment structure, and a control circuit. The optical component reflects or refracts light. The electromagnetic switch, at one side of the optical component, rotates and moves the optical component in a first direction. The auxiliary adjustment structure, on the optical component, rotates and moves the optical component in a second direction different from the first direction. The control circuit, coupled to the electromagnetic switch, adjusts an on-off signal of the electromagnetic switch according to a native frequency of the switching system from an initial signal.

The electromagnetic switch and the auxiliary adjustment structure are on the same end or different ends of the optical component. The switch further comprises a fulcrum, and the optical component rotates or moves with respect to the fulcrum.

The auxiliary adjustment structure can be a spring, a magnet, a constant-frequency electromagnetic switch, or a flexible structure. The frequency of the constant-frequency electromagnetic switch has a programmable or fixed frequency. The electromagnetic switch can be a voice coil. The control circuit outputs a drive signal to adjust the on-off signal of the electromagnetic switch. The drive signal is a sinusoidal waveform signal or a square waveform signal as sinusoidal waveform. The control circuit is an open loop circuit.

An embodiment of the control circuit comprises a resistor, an amplifier, a comparator and a controller. The resistor is serially connected to the electromagnetic switch. The amplifier is coupled to two ends of the resistor. The comparator is coupled to the amplifier, and the controller is coupled to the comparator. The controller obtains the native frequency of the switching system, and adjusts the on-off signal of the electromagnetic switch according to the native frequency.

Another embodiment of the control circuit comprises a resistor, a pre-processor and a post-processor. The resistor is serially connected to the electromagnetic switch. The pre-processor is coupled to two ends of the resistor. The post-processor, coupled to the pre-processor, obtains the native frequency of the switching system, and adjusts the on-off signal of the electromagnetic switch according as the native frequency.

Another embodiment of the control circuit comprises a resistor and a controller. The resistor is serially connected to the electromagnetic switch. The controller is coupled to two ends of the resistor. The controller obtains the native frequency of the switching system, and adjusts the on-off signal of the electromagnetic switch according as the native frequency.

The invention also provides another switching system. The switching system comprises an optical component, an electromagnetic switch and a control circuit. The optical component reflects or refracts lights. The electromagnetic switch, at one side of the optical component, rotates and moves the optical component. The control circuit, coupled to the electromagnetic switch, adjusts an on-off signal of the electromagnetic switch according to a native frequency of the switching system from an initial signal.

A method for adjusting a switching system is also provided. The method comprises providing an initial signal to the switching system and obtaining a native frequency thereof from a voltage-time waveform of the switching system. The waveform can be converted from analog to digital. The waveform can be sinusoidal, or square as sinusoidal. Since the switching system is adjusted according to the native frequency, a complex circuit or control program is avoided. Besides, the switching system can switch rapidly and precisely.

DETAILED DESCRIPTION

Figure 2:
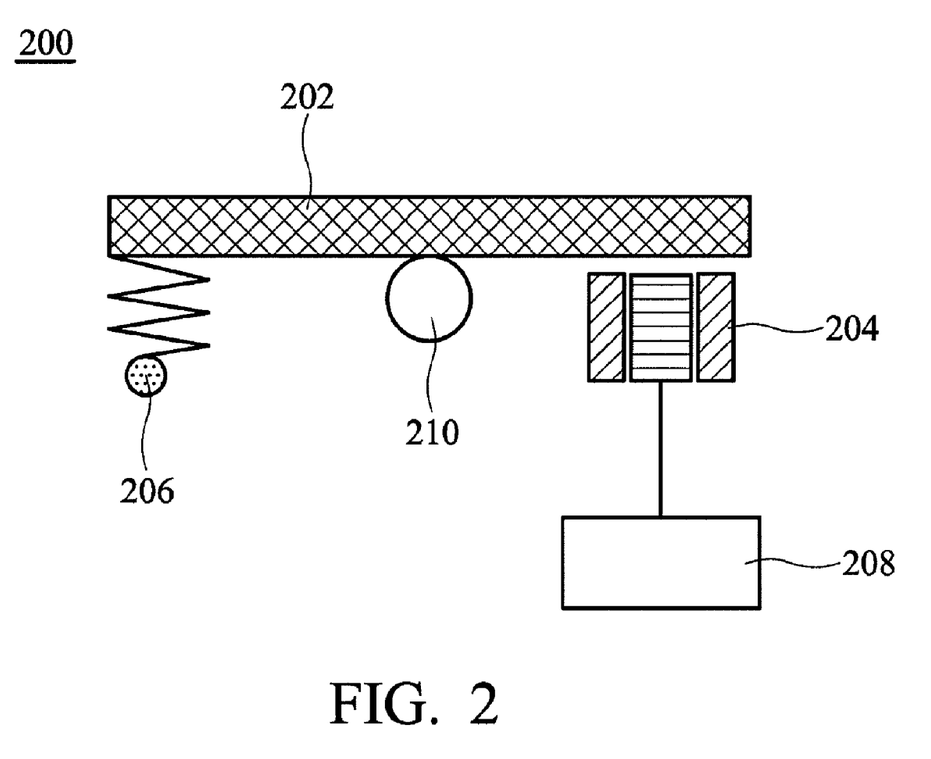
FIG. 2 shows an embodiment of a switching system of the invention.

FIG. 2 is a block diagram of a switching system 200 according to a first embodiment of the invention. The switching system 200 comprises an optical component 202, an electromagnetic switch 204, an auxiliary adjustment structure 206, and a control circuit 208. The switching system 200 can be applied in a projection system or other optic system.

The optical component 202 reflects or refracts light and may be a DMD (Digital Micro optical component Device), LCos (Liquid Crystal on Silicon), lens or mirror. The optical component can be flat, hemisphere, concave, or convex.

The electromagnetic switch 204, at one side of the optical component 202, rotates and moves the optical component in a first direction. The switching frequency of the electromagnetic switch 204 is controlled by control circuit 208. The electromagnetic switch 204 can be a voice coil.

Figure 4A:
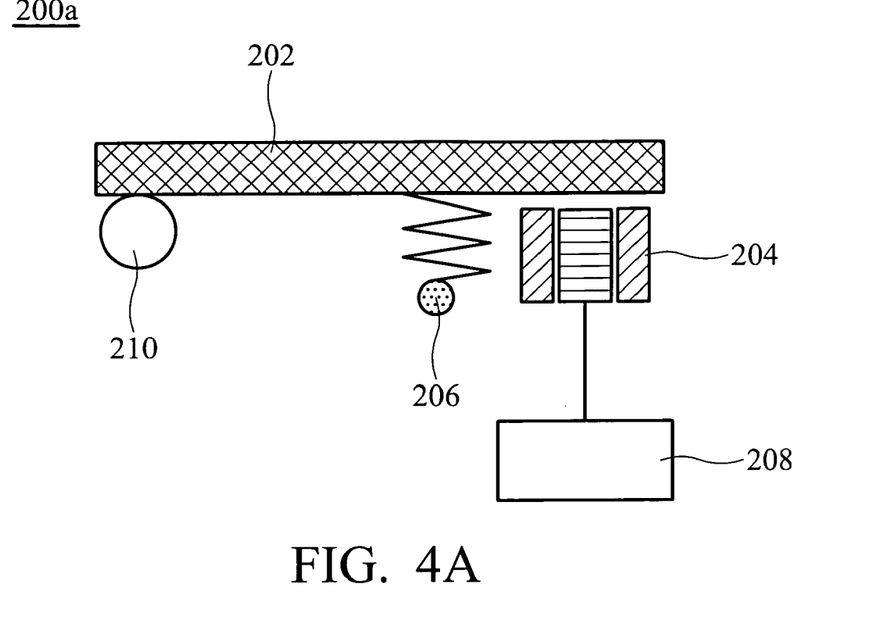
FIG. 4A-4D show other switching systems of the invention.
Figure 4B:
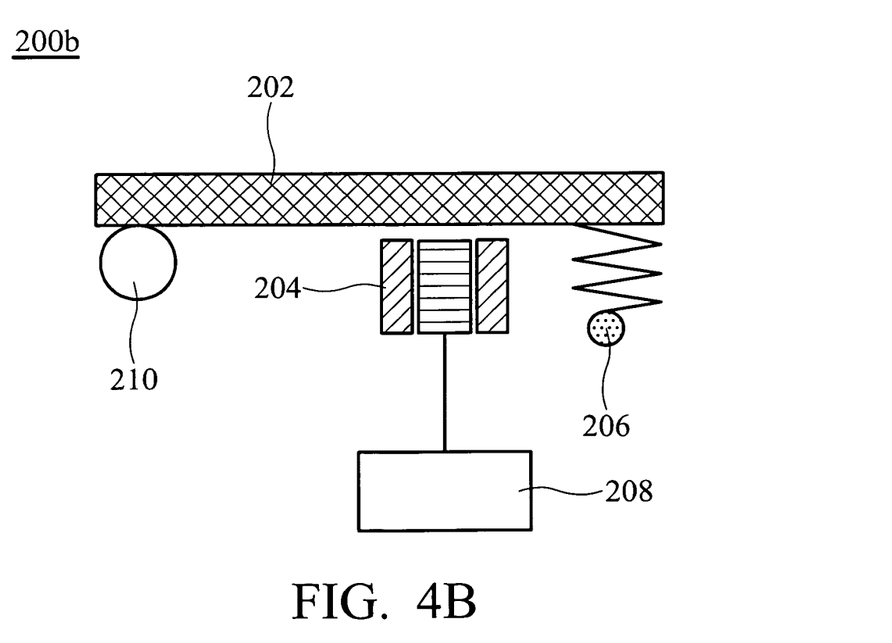
Figure 4C:
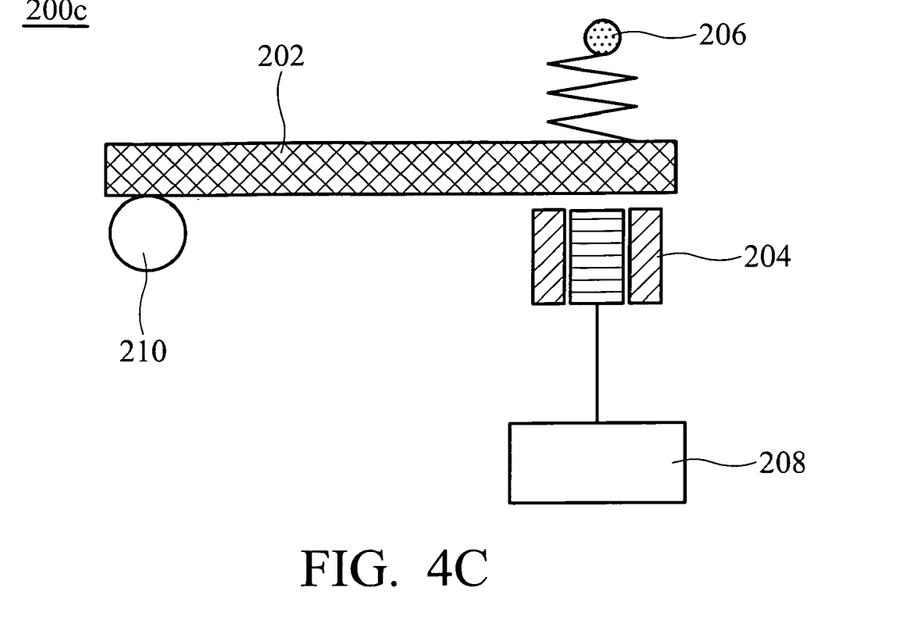
Figure 4D:
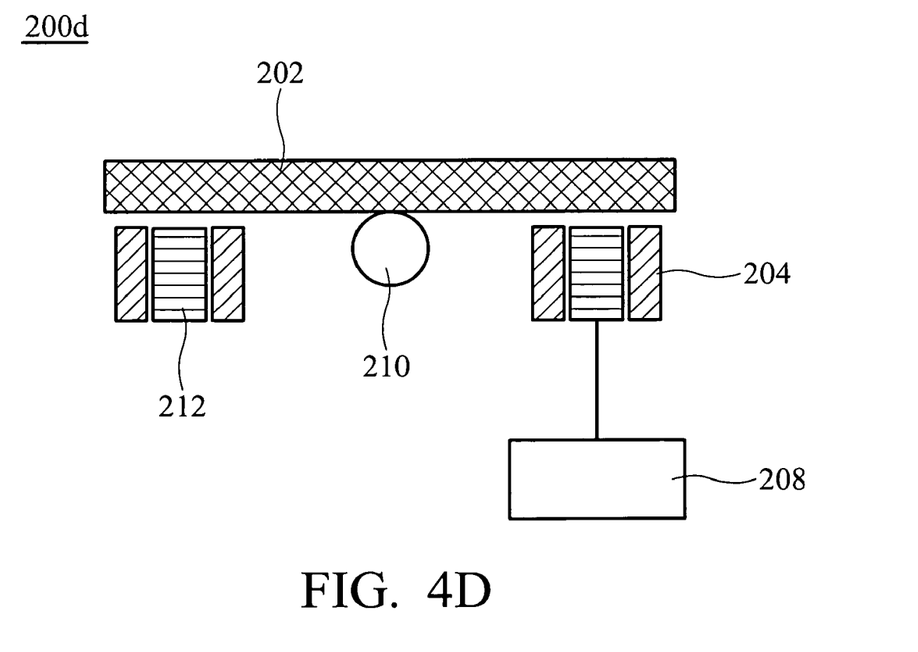

The auxiliary adjustment structure 206 is located on or direct contacted to the optical component 202. The auxiliary adjustment structure 206 rotates and moves the optical component in a second direction different from the first direction. The auxiliary adjustment structure 206 and the electromagnetic switch 204 may be on the same end or the different ends of the optical component 202. The auxiliary adjustment structure 206 can be a spring as shown in FIG. 2, a constant-frequency electromagnetic switch 212 as shown in FIG. 4D, magnet, flexible structure, or oscillatory structure. The frequency of the constant-frequency electromagnetic switch has a programmable or fixed frequency.

The control circuit 208, coupled to the electromagnetic switch 204, adjusts an on-off signal of the electromagnetic switch 204 according to a native frequency of the switching system 200, wherein the native frequency is obtained from an initial signal. The control circuit 208 obtains a single pulse signal, a sinusoidal waveform signal, or a square waveform signal to be the initial signal. The initial signal is input to the electromagnetic switch 204, and a voltage-time waveform of the switching system 200 is obtained. After analyzing the voltage-time waveform, the native frequency is determined, as the native frequency f0 shown in FIG. 5. The voltage-time waveform can be analog or digital. The control circuit 208 outputs a drive signal to the electromagnetic switch 204 for adjusting the on-off signal of the electromagnetic switch 204. The drive signal can be a sinusoidal waveform signal, a square waveform signal, or a square waveform signal. The control circuit 208 can be an open loop circuit. Since the control circuit 208 controls the electromagnetic switch 204 according to voltage-time waveform, an additional monitoring devices is not needed. Cost of the switching system 200 and the positioning time position are both reduced, and an operating reliability of the switching system 200 is increased.

Further, the control circuit 208 can use the native frequency to be the switch frequency of the electromagnetic switch 204 of the switching system 200, or the control circuit 208 adjusts the on-off signal of the electromagnetic switch 204 by the native frequency to rotate or move the optical component 202 as required.

Figure 3A:
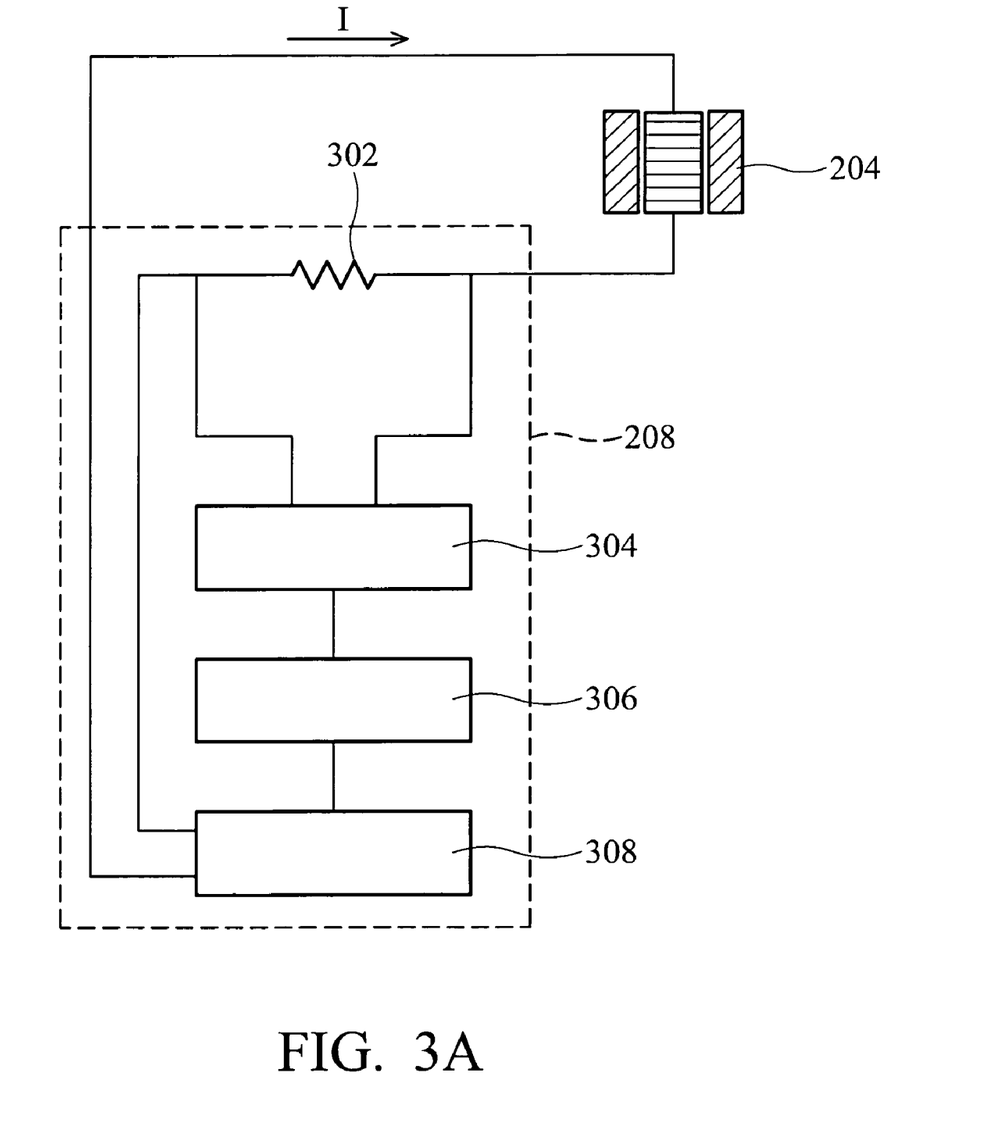
FIG. 3A shows a first embodiment of a control circuit of the invention.
Figure 5:
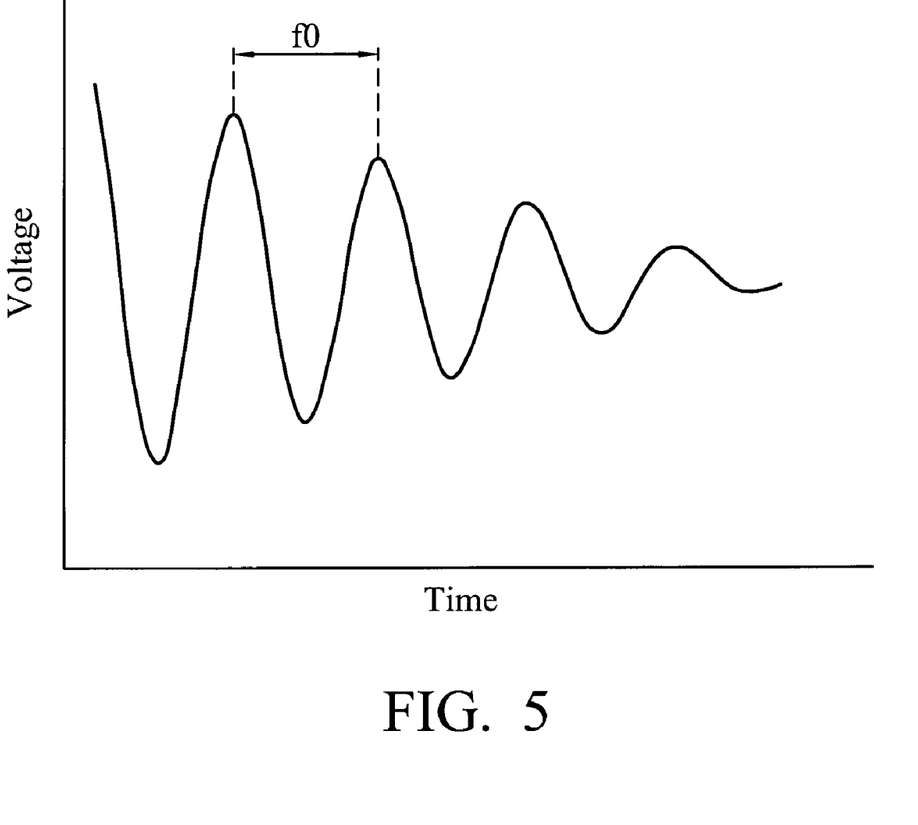
FIG. 5 shows a voltage-time waveform of the switching system according to the invention.

FIG. 3A shows a control circuit 208 according to a first embodiment of the invention. The control circuit 208 comprises a resistor 302, an amplifier 304, a comparator 306 and a controller 308. The resistor 302 is serially connected to the electromagnetic switch 204. The amplifier 304 is coupled to both ends of the resistor 302. The comparator 306 is coupled to the amplifier 304. The controller 308, coupled to the comparator 306, analyzes the native frequency of the switching system 200 and adjusts the on-off signal of the electromagnetic switch 204 according to the native frequency. The amplifier 304 amplifies the voltage difference of both ends of the resistor 302, and obtains an analog voltage-time waveform as shown in FIG. 5. The comparator 306 converts the analog voltage-time waveform to digital. The controller 308 analyzes the digital voltage-time waveform to obtain the native frequency of the switching system. The controller 308 adjusts the on-off signal of the electromagnetic switch 204 according to the native frequency to rotate or move the optical component 202. The controller 308 can be a microprocessor.

Figure 3B:
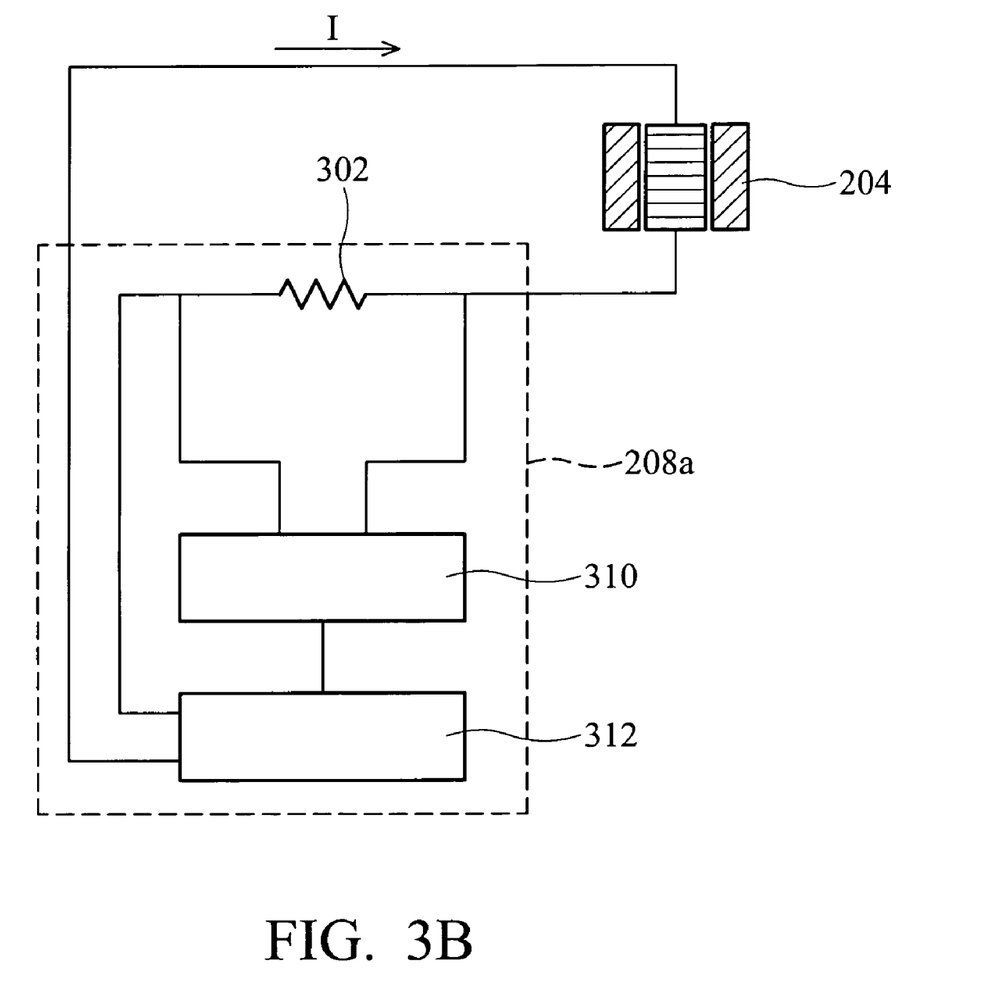
FIG. 3B shows a second embodiment of a control circuit of the invention.
Figure 3C:
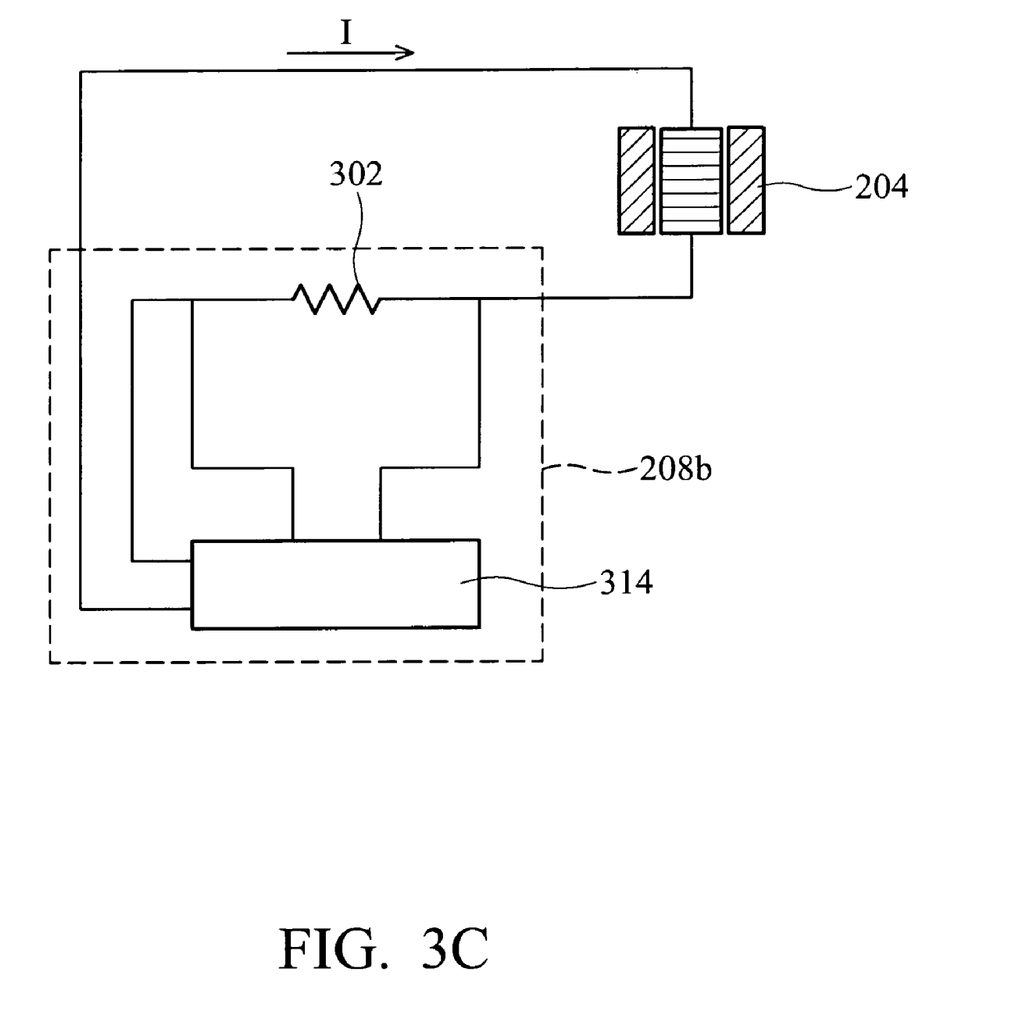
FIG. 3C shows a third embodiment of a control circuit of the invention.
Figure 3D:
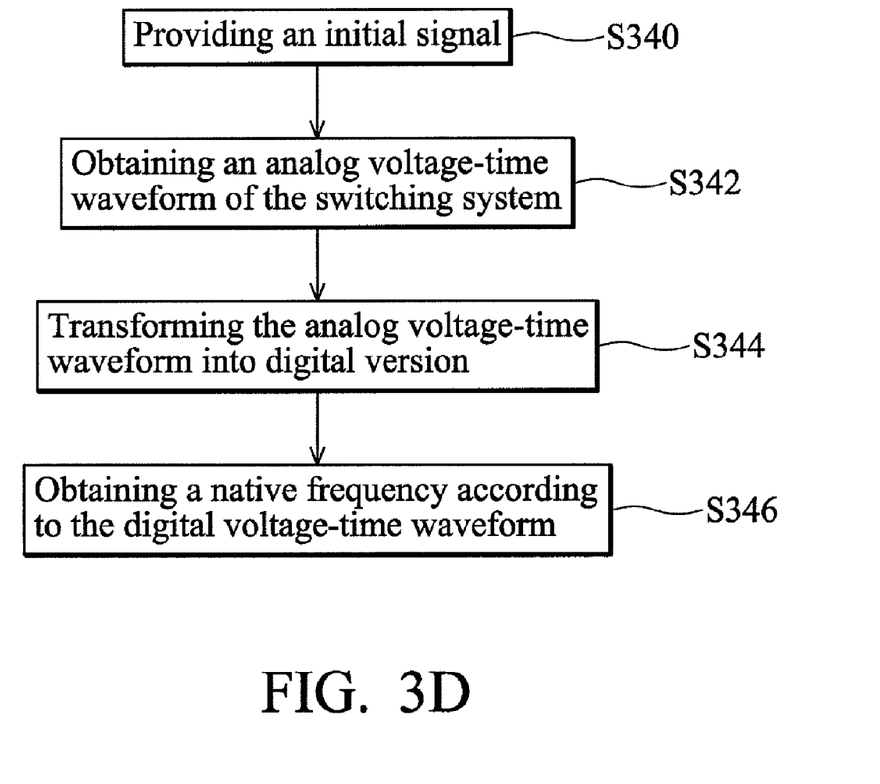
FIG. 3D shows a switching method according to the invention.

FIG. 3D shows a switching method according to the embodiment of the invention. An initial signal is provided for the switching system in step S340. Then, in step S342, the controller 304 obtains an analog voltage-time waveform of the switching system. After the analog voltage-time waveform is converted to digital voltage-time waveform in step S344, the controller 308 obtains the native frequency according the digital waveform in step S346.

Since the voltage difference at both ends of the resistor 302 is amplified appropriately and the waveform digitized, the controller 308 can analyze the waveform to obtain the native frequency easily and quickly, and adjust the position of the optical component 202 rapidly and precisely.

In a second embodiment of the invention, a control circuit 208a shown in FIG. 3B comprises a resistor 302, a pre-processor 310, and post-processor 312. The pre-processor 310 can be a comparator or an amplifier, and the post-processor 312 can be a microprocessor.

In this second embodiment of the invention, the control circuit 208a obtains either the analog or digital voltage-time waveform of the resistor 302 through the pre-processor 310. The post-processor 312 analyzes the waveform to obtain the native frequency of the switching system 200. The post-processor 312 adjusts the on-off signal of the electromagnetic switch 204 according to the native frequency to rotate or move the optical component 202.

Fewer elements are used in the second embodiment of the invention, so costs of the switching system are further reduced.

In a third embodiment of the invention, the control circuit 208b shown in FIG. 3C comprises a resistor 302 and a controller 314. The controller can be a microprocessor.

In a third embodiment of the invention, the control circuit 208b obtains the analog (or digital) voltage-time wave of the resistor 302 by the controller 314. The controller 314 adjusts the on-off signal of the electromagnetic switch 204 according to the native frequency to rotate or move the optical component 202.

Fewer elements are used in the third embodiment of the invention than the first embodiment, such that costs of the switching system according to the third embodiment are also reduced.

The switching system 200 further comprises a fulcrum 210. The optical component 202 rotates or moves on the fulcrum 210. The optical component 202 is divided into two parts depending on the fulcrum 210, and the relative positions of the electromagnetic switch 204 and auxiliary adjustment structure 206 are varied. For example, in a switching system 200a shown in FIG. 4A, the electromagnetic switch 204 and the auxiliary adjustment structure 206 can be at the same end of the optical component 202, and the electromagnetic switch 204 is at the outside of the auxiliary adjustment structure 206. In a switching system 200b shown in FIG. 4B, the electromagnetic switch 204 and the auxiliary adjustment structure 206 can be at the same end of the optical component 202, and the auxiliary adjustment structure 206 is at the outside of the electromagnetic switch 204. In a switching system 200c shown in FIG. 4C, the electromagnetic switch 204 and the auxiliary adjustment structure 206 are at the same end of the optical component 202, but the auxiliary adjustment structure 206 and the electromagnetic switch 204 are on different sides of the optical component 202, respectively. In a switching system 200d shown in FIG. 4D, the electromagnetic switch 204 and the constant-frequency electromagnetic switch 212 are at the different ends of the optical component 202, respectively.

Since the switching frequency is obtained from the native frequency, the frequency of the switching system of the invention can be adjusted rapidly and precisely. The switching system of the invention also requires no complicated loop circuits or control program.

The switching system of the invention is controlled by monitoring the voltage difference of the electromagnetic switch, such that no additional monitoring equipment is required, positioning time is reduced, and reliability of the operating the system is increased.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for adjusting a switching system, comprising steps of:
   providing an initial signal to the switching system;
   obtaining an analog voltage-time waveform of the switching system;
   converting the analog voltage-time waveform to a digital voltage-time waveform;
      obtaining a native frequency of the switching system according to the digital voltage-time waveform; and
      adjusting a switching frequency of the switching system according to the native frequency.

2. The method as claimed in claim 1, wherein the initial signal is a single pulse signal, a sinusoidal waveform signal, or a square waveform signal.

3. The method as claimed in claim 1, wherein obtaining the native frequency of the switching system further comprises steps of:
   obtaining a voltage-time waveform of the switching system; and
   obtaining the native frequency according to the voltage-time waveform.

4. A switching system, comprising:
   an optical component reflecting or refracting a light;
      an electromagnetic switch coupled to the optical component for rotating or moving the optical component in a first direction; and
      a control circuit coupled to the electromagnetic switch for adjusting an on-off signal of the electromagnetic switch according to a native frequency of the switching system from an initial signal.

5. The switching system as claimed in claim 4, further comprising a fulcrum, wherein the optical component rotates or moves with respect to the fulcrum.

6. The switching system as claimed in claim 4, wherein the control circuit comprises:
   a resistor coupled to the electromagnetic switch;
   an amplifier coupled to the resistor;
   a comparator coupled to the amplifier; and
      a controller coupled to the comparator, obtaining the native frequency and adjusting the on-off signal of the electromagnetic switch according to the native frequency.

7. The switching system as claimed in claim 6, wherein the controller is a microprocessor.

8. The switching system as claimed in claim 4, wherein the control circuit comprises:
   a resistor coupled to the electromagnetic switch;
   a pre-processor coupled to the resistor; and
      a post-processor coupled to the pre-processor for obtaining the native frequency and adjusting the on-off signal of the electromagnetic switch according to the native frequency.

9. The switching system as claimed in claim 8, wherein the post-processor is a microprocessor.

10. The switching system as claimed in claim 8, wherein the pre-processor is a comparator or an amplifier.

11. The switching system as claimed in claim 4, wherein the control circuit comprises:
    a resistor coupled to the electromagnetic switch; and
       a controller coupled to the resistor for obtaining the native frequency and adjusting the on-off signal of the electromagnetic switch according to the native frequency.

12. The switching system as claimed in claim 11, wherein the controller is a microprocessor.

13. The switching system as claimed in claim 4, wherein the electromagnetic switch is a voice coil.

14. The switching system as claimed in claim 4, wherein the control circuit is an open loop circuit, and the control circuit outputs a drive signal to adjust the on-off signal of the electromagnetic switch.

15. The switching system as claimed in claim 14, wherein the drive signal is a sinusoidal waveform signal, square waveform signal, or a square waveform signal.

16. The switching system as claimed in claim 4, wherein the optical component is a digital micro-optical component device (DMD), a liquid crystal on silicon (LCoS), a lens, or a mirror.

17. The switching system as claimed in claim 4, further comprising an auxiliary adjustment structure corresponding to the electromagnetic switch, wherein the auxiliary adjustment structure controls the optical component to rotate or move in a second direction different from the first direction.

18. The switching system as claimed in claim 17, wherein the auxiliary adjustment structure is a spring, a constant-frequency electromagnetic switch, magnet, flexible structure, or oscillatory structure.

19. The switching system as claimed in claim 18, wherein the constant-frequency electromagnetic switch has a programmable or fixed frequency.

* * * * *

UNITED STATES PATENT AND TRADEMARK OFFICE
CERTIFICATE OF CORRECTION

| | | |
|---|---|---|
| PATENT NO. | : 7,772,722 B2 | Page 1 of 1 |
| APPLICATION NO. | : 11/390063 | |
| DATED | : August 10, 2010 | |
| INVENTOR(S) | : Jen-Chih Wang et al. | |

It is certified that error appears in the above-identified patent and that said Letters Patent is hereby corrected as shown below:

IN THE SPECIFICATION:

Column 2, line 19, change "lights" to --light--.

Column 2, line 30, after "or square", delete "as sinusoidal".

Column 3, lines 30-31, after "sinusoidal waveform signal", delete ", a square waveform signal,".

Signed and Sealed this

Eighteenth Day of January, 2011

David J. Kappos
*Director of the United States Patent and Trademark Office*